US009778352B2

United States Patent
Mizutani

(10) Patent No.: US 9,778,352 B2
(45) Date of Patent: Oct. 3, 2017

(54) OBJECT RECOGNITION APPARATUS

(71) Applicant: HONDA MOTOR CO., LTD., Minato-Ku, Tokyo (JP)

(72) Inventor: Katsuya Mizutani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/706,066

(22) Filed: May 7, 2015

(65) Prior Publication Data

US 2015/0324652 A1 Nov. 12, 2015

(30) Foreign Application Priority Data

May 9, 2014 (JP) .................. 2014-097381

(51) Int. Cl.
*G01S 13/86* (2006.01)
*G06K 9/00* (2006.01)
(Continued)

(52) U.S. Cl.
CPC .......... *G01S 13/867* (2013.01); *G01S 13/726* (2013.01); *G01S 13/931* (2013.01); *G06K 9/00805* (2013.01); *G06T 7/248* (2017.01); *G06T 7/74* (2017.01); *G08G 1/166* (2013.01); *G01S 2013/9353* (2013.01);
(Continued)

(58) Field of Classification Search
None
See application file for complete search history.

(56) References Cited

U.S. PATENT DOCUMENTS 6,535,114 B1 * 3/2003 Suzuki ............... G06T 7/20
340/435
6,594,583 B2 * 7/2003 Ogura ............... G08G 1/166
340/435

(Continued)

FOREIGN PATENT DOCUMENTS

DE 10 2008 013 366 A1 9/2009
DE 10 2013 003 117 A1 8/2013
(Continued)

OTHER PUBLICATIONS

JP 2004-347471 machine translation Dec. 9, 2004.*
(Continued)

*Primary Examiner* — Nancy Bitar
(74) *Attorney, Agent, or Firm* — Carrier Blackman & Associates, P.C.; Joseph P. Carrier; Jeffrey T. Gedeon

(57) ABSTRACT

In an object recognition apparatus mounted on a vehicle, comprising: a plurality of recognizers each adapted to conduct object recognition ahead of the vehicle at intervals; and an object continuity determiner adapted to conduct object continuity determination based on a result of the object recognition conducted by the recognizers; the object continuity determiner determines that, when a first object recognized by any of the object recognizers at time (N) is present at a position within a predetermined area defined by a position of a second object recognized by other of the object recognizers at time (N−1) earlier than the time (N), the first object and the second object are identical to each other to be one object which is kept recognized continuously for a time period ranging from at least the time (N−1) to the time (N).

9 Claims, 9 Drawing Sheets

(51) Int. Cl.
*G01S 13/72* (2006.01)
*G01S 13/93* (2006.01)
*G08G 1/16* (2006.01)
*G06T 7/73* (2017.01)
*G06T 7/246* (2017.01)

(52) U.S. Cl.
CPC ............... *G01S 2013/9367* (2013.01); *G06T 2207/30241* (2013.01); *G06T 2207/30261* (2013.01)

(56) References Cited

U.S. PATENT DOCUMENTS

| | | | | |
|---|---|---|---|---|
| 6,862,527 | B2* | 3/2005 | Okamura | G01S 7/412 340/435 |
| 7,825,849 | B2* | 11/2010 | Tsuchida | G01S 13/931 342/52 |
| 8,705,797 | B2 | 4/2014 | Zeng et al. | |
| 8,941,479 | B2* | 1/2015 | Igarashi | G06K 9/00798 340/435 |
| 9,053,554 | B2* | 6/2015 | Uchida | G06K 9/00805 |
| 9,449,518 | B2* | 9/2016 | Mochizuki | G08G 1/165 |
| 2004/0024498 | A1* | 2/2004 | Okamura | G01S 7/412 701/1 |
| 2009/0135065 | A1 | 5/2009 | Tsuchida et al. | |
| 2013/0002470 | A1 | 1/2013 | Kambe et al. | |
| 2013/0035846 | A1* | 2/2013 | Shih-Chia | G06Q 10/06311 701/408 |
| 2013/0194086 | A1* | 8/2013 | Igarashi | G06K 9/00798 340/435 |
| 2013/0335259 | A1 | 12/2013 | Yasugi et al. | |
| 2015/0254983 | A1* | 9/2015 | Mochizuki | G08G 1/165 340/435 |

FOREIGN PATENT DOCUMENTS

| | | |
|---|---|---|
| DE | 10 2013 203 165 A1 | 9/2013 |
| JP | 2002-222487 A | 8/2002 |
| JP | 2004-347471 A | 12/2004 |
| JP | 2004347471 * | 12/2004 |
| JP | 2007-226680 A | 9/2007 |
| JP | 2007-272441 A | 10/2007 |
| JP | 2012-189445 A | 10/2012 |
| JP | 2013-002927 A | 1/2013 |

OTHER PUBLICATIONS

Office Action dated Aug. 11, 2016 in the corresponding German Patent Application 10 2015 208 599.6 with the English translation thereof.

Office Action dated Dec. 20, 2016 in the corresponding Chinese Patent Application 201510226519.6 with the English translation thereof.

Office Action dated Feb. 14, 2017 in the corresponding Japanese Patent Application 2014-097381 with the English translation thereof.

* cited by examiner

OBJECT RECOGNITION APPARATUS

BACKGROUND OF THE INVENTION

Field of the Invention

Embodiments of this invention relate to an object recognition apparatus, more specifically to an apparatus equipped with a plurality of object recognizers or recognizing means, which continuously recognizes an object present ahead of a subject vehicle.

Description of Related Art

Apparatuses have been known for some time that are equipped with a plurality of object recognizers and continuously recognize an object such as a preceding vehicle present ahead of the subject vehicle. For example, Patent Document 1 (Japanese Laid-Open Patent Application No. 2004-347471) teaches use of image data from a camera and radar data from a laser radar or the like to determine whether a preceding vehicle detected at previous time and a preceding vehicle detected at current time are identical to be one object that is kept recognized continuously by assigning an identification number to the detected preceding vehicle, thereby enabling continuous recognition of the preceding vehicle.

BRIEF SUMMARY OF THE INVENTION

In the teaching of Patent Document 1, an object detected by the camera at time is assigned with an individual identification number and an object detected by the radar at time is assigned with a different individual number, and the detected object is determined to be identical when the individual identification number concerned is the same as that assigned at different time. Therefore, for example, when an object was detected only by the camera at previous time while it is detected only by the radar at current time, it is not possible to determine the object identical and to recognize the object continuously (i.e., it is not possible to relate the object detected by the radar at current time to the object detected by the camera at previous time).

Incidentally, Patent Document 1 teaches, if the camera temporally loses the sight of the object, to restore it by selecting an object whose identification number is identical to that of the lost one from stored data and by interpolating the number and adjacent numbers. However, this needs the object be detected continuously on the side of the radar. Thus, it is not possible to recognize the object continuously when only one of the camera and radar detects the object at a certain time and only the other detects the object at a time next thereto.

Therefore, embodiments of this invention is directed to overcome the aforesaid problem by providing an object recognition apparatus equipped with a plurality of object recognizers which enables to continuously recognize an object present ahead of a vehicle even when the object is detected only by one of the recognizers.

In order to achieve the object, the embodiments of this invention provides, in a first aspect, an object recognition apparatus mounted on a vehicle, comprising: a plurality of recognizers each adapted to conduct object recognition ahead of the vehicle at intervals; and an object continuity determiner adapted to conduct object continuity determination based on a result of the object recognition conducted by the recognizers; wherein: the object continuity determiner determines that, when a first object recognized by any of the object recognizers at time (N) is present at a position within a predetermined area defined by a position of a second object recognized by other of the object recognizers at time (N-1) earlier than the time (N), the first object and the second object are identical to each other to be one object which is kept recognized continuously for a time period ranging from at least the time (N-1) to the time (N).

In order to achieve the object, the embodiments of this invention provides, in a second aspect, an object recognition method of a vehicle having a plurality of recognizers each adapted to conduct object recognition ahead of the vehicle at intervals, comprising the steps of: determining object continuity based on a result of the object recognition conducted by the recognizers; wherein: the step of object continuity determining determines that, when a first object recognized by any of the object recognizers at time (N) is present at a position within a predetermined area defined by a position of a second object recognized by other of the object recognizers at time (N-1) earlier than the time (N), the first object and the second object are identical to each other to be one object which is kept recognized continuously for a time period ranging from at least the time (N-1) to the time (N).

BRIEF DESCRIPTION OF THE DRAWINGS

The above and other objects and advantages of embodiments of this invention will be more apparent from the following description and drawings in which.

DETAILED DESCRIPTION OF THE INVENTION

Embodiments of an object recognition apparatus according to this invention are explained with reference to the attached drawings in the following.

Embodiment 1

Figure 1:
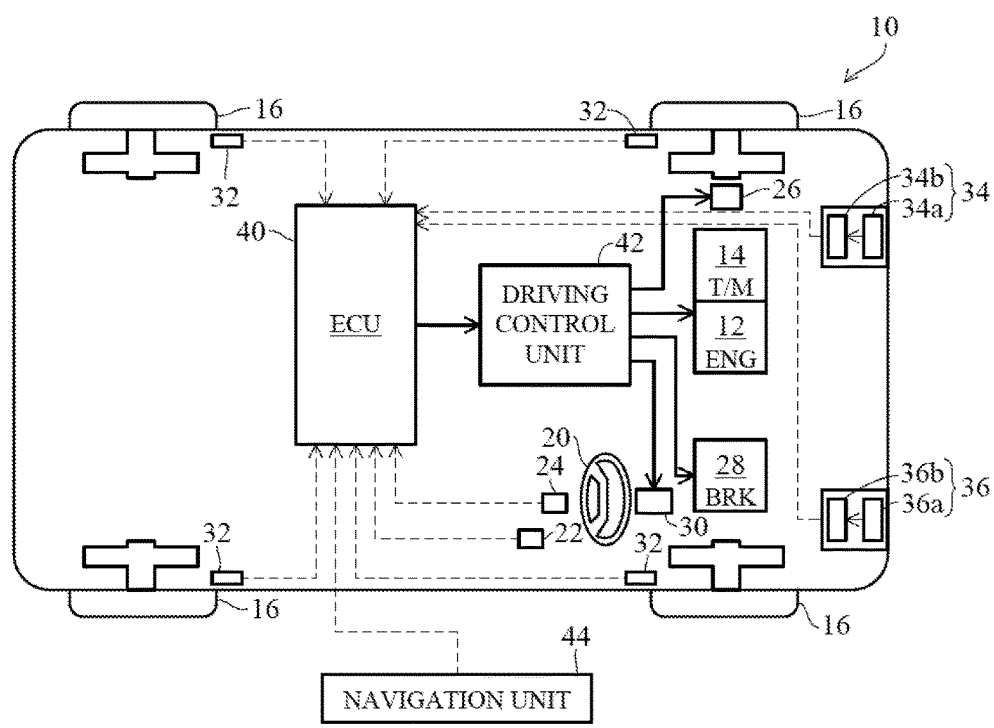
FIG. 1 is an overall schematic view of an object recognition apparatus according to a first embodiment of this invention.

FIG. 1 is an overall schematic view of an object recognition apparatus according to a first embodiment of this invention.

Reference numeral 10 in FIG. 1 designates a vehicle (subject vehicle) having an engine (internal combustion engine; designated ENG in FIG. 1) 12 installed at the front and being adapted to run on a road. The speed and output of the engine 12 are regulated by a transmission (designated T/M in FIG. 1) 14 and transmitted to wheels 16 to drive the vehicle 10.

A steering angle sensor 22 installed near a steering wheel 20 provided at the driver's seat of the vehicle 10 outputs a signal proportional to a steering angle inputted by the driver through the steering wheel 20, and a torque sensor 24 is installed that outputs a signal proportional to the direction and magnitude of a steering force (steering torque) inputted by the driver through the steering wheel 20.

An electric motor 26 for steering assistance is installed near the front wheels to assist driver steering. Specifically, a mechanism that converts rotation of a steering wheel inputted by the driver and transmitted from a steering shaft and the like to reciprocating motion of a rack through a pinion (not shown) to steer the front wheels via tie rods (not shown) is provided on the rack with the electric motor 26.

The vehicle 10 is equipped with a brake hydraulic mechanism (designated BRK in FIG. 1) 28 that applies braking force (deceleration force) to the wheels 16 in proportion to driver braking operation inputted through a brake pedal (not shown) installed on the floor at the driver's seat of the vehicle 10. A warning device 30 comprising an audio speaker, a visible indicator and the like is installed at the driver's seat of the vehicle 10 for warning the driver audibly, visually and so on.

A vehicle speed sensor 32 installed near each wheel 16 outputs a pulse signal once every predetermined rotation angle of the wheel, in proportion to the vehicle speed V of the vehicle 10.

The front or other suitable part of the vehicle 10 is equipped with a radar unit (first recognizer) 34. The radar unit 34 emits a millimeter-wave beam or other electromagnetic beam in the advance direction of the vehicle 10 from a radar 34a installed, for example, on a nose at the front of the body of the vehicle 10 and receives/processes a wave reflected from an object(s) (such as a preceding vehicle or other obstacle) present in the advance direction when the vehicle 10 advances on the road, thereby enabling to detect and recognize the object(s) at intervals.

The received wave is sent to a radar output processing unit 34b comprising a microcomputer. The radar output processing unit 34b calculates a relative distance from the vehicle 10 to the object by measuring the time from the emission of the laser beam to the receipt or return of the reflected laser beam and further differentiates the relative distance to determine the relative speed of the object to the vehicle 10. Moreover, the direction of the object is determined from the incidence direction of the reflected beam, thereby obtaining position, speed and other data on the object at intervals.

The vehicle 10 is further equipped with an imaging unit (second recognizer) 36. The imaging unit 36 comprises a camera 36a constituted by a CCD camera or C-MOS camera (monocular camera; imaging device) and an image processor 36b. The camera 36a is installed to take images in the advance direction of the vehicle 10. The image processor 36b conducts known image processing such as filtering and binarization on the images taken by the camera 36a, generates image data, and obtains data on position, speed, etc., of the object present in the advance direction of the vehicle 10 at intervals as is done in the radar unit.

The data of the object(s) obtained by the radar unit 34 and imaging unit 36 at intervals is sent to an ECU (electronic control unit; object recognition apparatus) 40. The outputs of the aforesaid sensors (steering angle sensor 22, torque sensor 24 and vehicle speed sensors 32) are also sent to the ECU 40. Although not illustrated, the ECU 40 comprises a microcomputer that has inter alia, a CPU, RAM, ROM and I/O circuit.

The ECU 40 determines object continuity based on the information obtained by the radar unit 34 and the imaging unit 36. More specifically, based on the data of the object obtained by the radar unit 34 and imaging unit 36, the ECU 40 determines whether objects detected and recognized at different times are identical to each other to be one object which is kept recognized continuously for a certain time period.

A driving control unit 42 is responsive to signals sent from the ECU 40 for assisting the driver to steer the steering wheel 20 (steering assistance control), performing collision avoidance assistance control for avoiding collision with the recognized object recognized by the radar unit 34 and imaging unit 36, performing vehicle-following control, and other driving assistance control. The aforesaid collision avoidance assistance control may includes, in addition to control of the steering wheel 20 and the engine 12 and transmission 14, control of the brake hydraulic mechanism 28 and accelerator, etc.

A navigation unit 44 is mounted on the vehicle 10. With this, although not discussed later, in addition to the data from the radar unit 34 and imaging unit 36, it will be possible for the ECU 40 to obtain position and speed data on objects present in the advance direction of the vehicle 10 utilizing data obtained from the navigation unit 44.

Although no further details will be explained here, the object recognizers for recognizing objects present in the advance direction of the vehicle 10 are not limited to the foregoing ones, it may be one that utilizes data obtained regarding, for example, infrastructure facilities built by the road where the vehicle 10 runs.

Figure 2:
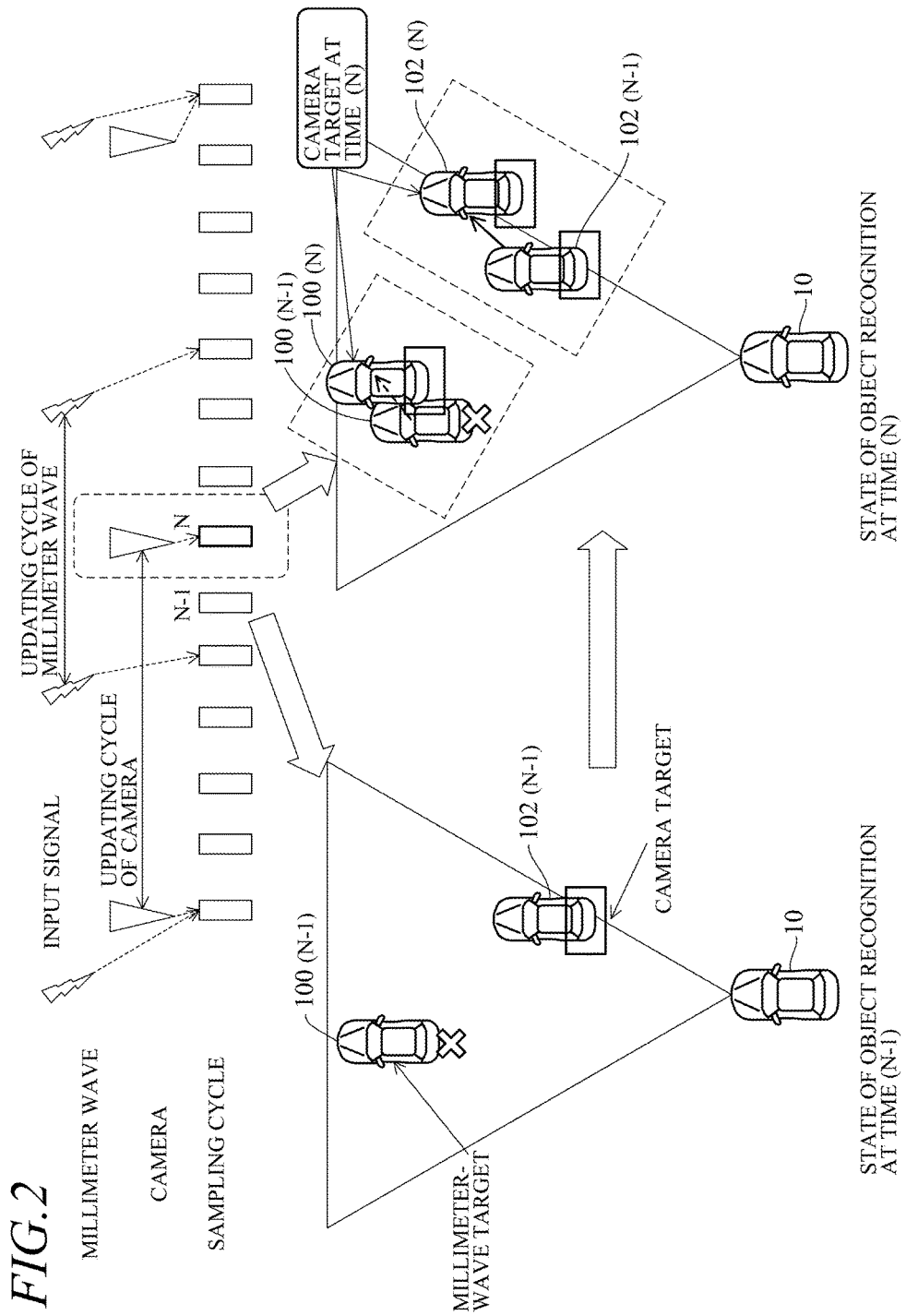
FIG. 2 is a diagram for explaining continuity determination processing of the object recognition apparatus shown in FIG. 1.
Figure 3:
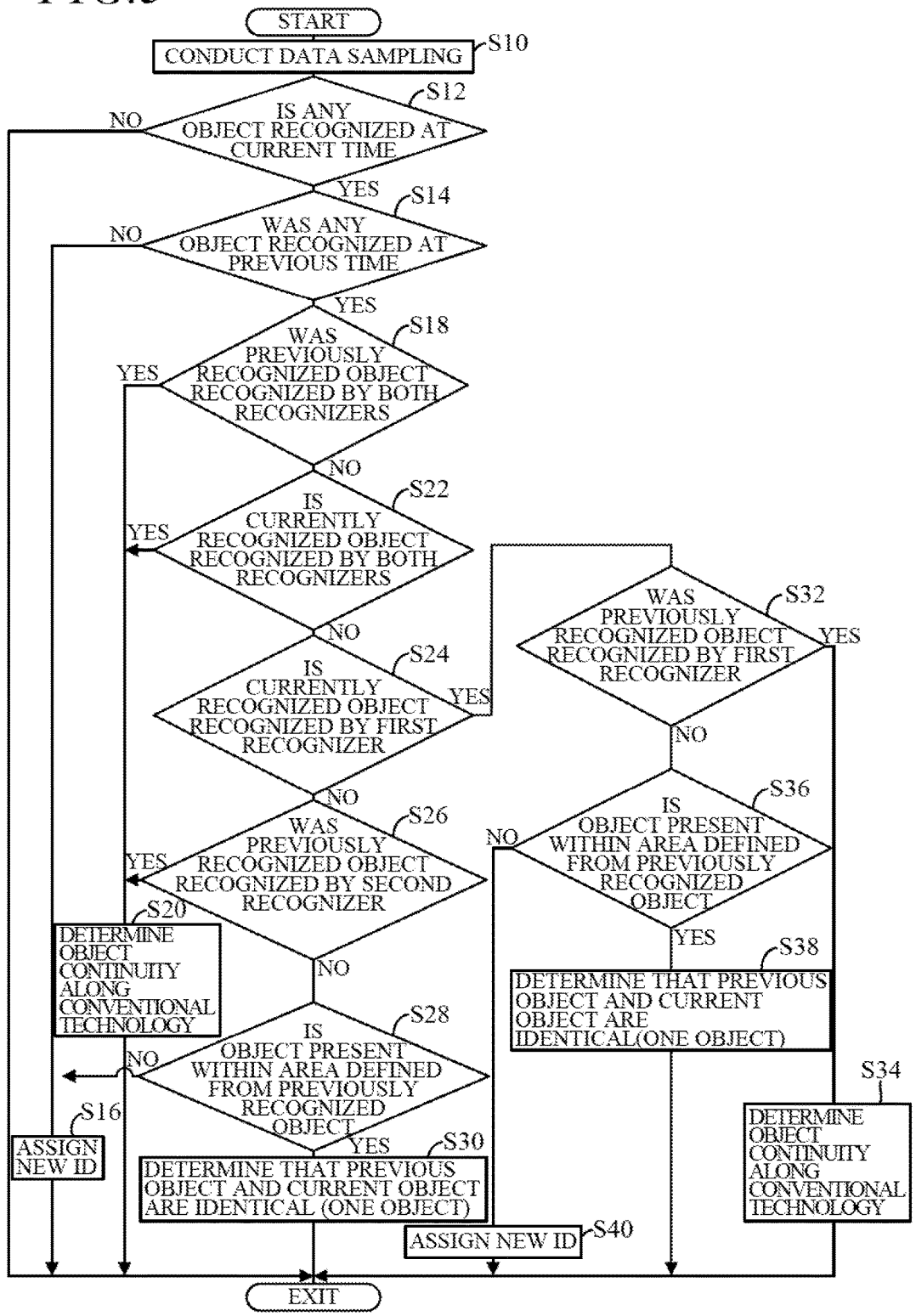
FIG. 3 is a flowchart showing the continuity determination processing of the object recognition apparatus, shown in FIG. 2.

FIG. 2 is a diagram for explaining object continuity determination processing of the ECU 40, more concretely a diagram for explaining processing for continuously recognizing the object present in the advance direction of the vehicle 10, and FIG. 3 is a flowchart showing the object continuity determination processing.

FIG. 2 indicates a state of object recognition (detection) at a previous time (time point) N−1 (that is earlier than or prior to a current time (time point) N) and a state of object recognition at the current time (time point) N.

It should be noted here that the processing described in the program illustrated in FIGS. 3, 6, 7 and 9 (mentioned below) is cyclically performed by the ECU 40 at predetermined intervals. In this specification, the term "previous time (time point) N−1)" or "current time (time point) N" means a time or time point at which the program is executed. Affix (N−1), (N) and the like added to the symbols of object (preceding vehicle) 100, 102 indicates the time or time point at which it is recognized or detected.

As shown there, the state of object recognition at the time (N−1) in FIG. 2 is based on an assumption that among of the objects (preceding vehicles) 100(N−1), 102(N−1) present in the advance direction of the vehicle (subject vehicle) 10, the preceding vehicle 100(N−1) is recognized only by the radar unit 34, while the preceding vehicle 102(N−1) is recognized only by the imaging unit 36. They are stored in the ECU 40 as a millimeter-wave target and a camera target respectively.

As shown there, the state of object recognition at the time (N) in FIG. 2 is based on an assumption that both of the preceding vehicles 100(N) and 102(N) are recognized only by the imaging unit 36 and are stored as camera targets respectively.

As described above, in such case, it is not possible for the conventional technology to determine the preceding vehicle 100 as one object which is kept recognized continuously. Specifically, since the preceding vehicle 100 is recognized by different recognizer (radar unit 34 and imaging unit 36) in the previous time and current time and stored only as the millimeter-wave target or camera target at the previous time and current time, it is not possible for the conventional technology to determine whether the preceding vehicle 100 is a same object that is present ahead in the advance direction of the vehicle 10 for a time ranging from previous time to the current time.

This invention aims to solve the above mentioned problem. In this embodiment, even when the object such as the preceding vehicle 100 is recognized by different recognizer in the previous time and current time, it becomes still possible to determine that the object is kept present ahead in the advance direction of the vehicle 10 continuously, i.e., to determine the preceding vehicle 100 as one object which is kept recognized continuously.

It should be noted that, since the preceding vehicle 102 is kept recognized by the imaging unit 36 and stored as the camera target in the ECU 40 both in the previous time and current time, it is possible even for the conventional technology to determine that the preceding vehicle 102 is kept present ahead in the advance direction of the vehicle 10 both in the previous time and current time continuously.

FIG. 3 is a flowchart showing the object continuity determination processing of the object recognition apparatus, shown in FIG. 2 for the above mentioned preceding vehicles 100, 102.

Explaining this, the program begins at S10, in which the ECU 40 conducts data sampling, i.e., it reads data acquired by the radar unit 34 and imaging unit 36. In FIG. 3 and FIGS. 6, 7 and 9 mentioned below, the symbol S indicates a processing step performed by the ECU 40.

The program next proceeds to S12, in which it is determined whether any object such as the preceding vehicle 100 or 102, signboard is detected or recognized ahead in the advance direction of the vehicle 10 at the current time. When the result in S12 is negative, i.e., it is determined that no object is present ahead of the vehicle 10, the program skips the ensuing processing steps.

On the other hand, when the result in S12 is affirmative, the program proceeds to S14, in which it is determined whether any object was detected or recognized ahead of the vehicle 10 at the previous time. When the result in S14 is negative, the program proceeds to S16, in which the object recognized at the current time is assigned with a new identification number (ID; mentioned below), and the program is terminated.

On the other hand, when the result in S14 is affirmative, the program proceeds to S18, in which it is determined whether the object recognized at the previous time was recognized by both the radar unit 34 and imaging unit 36. When the result in S18 is affirmative, the program proceeds to S20, in which continuity of the recognized object is determined along a manner same as the conventional technology.

Specifically, when the result in S18 is affirmative, since at least one of the radar unit 34 and imaging unit 36 recognizes the object present ahead of the vehicle 10 continuously in the previous time and current time, it is determined in S20 that the object is kept recognized continuously at the previous time and current time.

On the other hand, when the result in S18 is negative, the program proceeds to S22, in which it is determined whether the object recognized at the current time is recognized by both the radar unit 34 and imaging unit 36. When the result in S22 is affirmative, since at least one of the radar unit 34 and imaging unit 36 recognizes the object present ahead of the vehicle 10 continuously in the previous time and current time, the program proceeds to S20, in which it is determined that the object is kept recognized continuously at the previous time and current time.

On the contrary, when the result in S22 is negative, the program proceeds to S24, in which it is determined whether the object recognized at the current time is recognized only by the radar unit 34. When the result in S24 is negative, i.e., when it is determined that object present ahead of the vehicle 10 is recognized by the imaging unit 36, the program proceeds to S26.

In S26, it is determined whether the object recognized at the previous time was also recognized by the imaging unit 36 at the previous time. When the result in S26 is affirmative, the program proceeds to S20, in which it is determined that the object is kept recognized continuously at the previous time and current time since at least the imaging unit 36 recognizes the object at the previous time and current time continuously.

On the contrast, when the result in S26 is negative, i.e., when it is determined that the object was recognized only by the radar unit 34 at the previous time, but is recognized only by the imaging unit 36 at the current time, the program proceeds to S28.

In S28, it is determined whether the object recognized only by the imaging unit at the current time is present at a position within a predetermined area defined by a position of the object recognized by the radar unit 34 at the previous time. The predetermined area is set to be a value (based on the processing capability of the radar unit 34 and imaging unit 36) that enables to determine that the object recognized at the previous time and that recognized at the current time are identical to each other to be one same object.

Therefore, when the result in S28 is affirmative, the program proceeds to S30, in which it is determined that the object recognized only by the radar unit 34 at the previous time and that recognized only by the imaging unit 36 at the current time is identical to each other to be one same object which is kept recognized continuously.

However, when the result in S28 is negative, i.e., when it is determined that the object recognized by the imaging unit 36 at the current time is not identical to that recognized at the previous time, the program proceeds to S16, in which the object recognized at the current time is assigned with new identification number (ID), and the program is terminated.

It should be noted that, in this specification, saying that no object is recognized does not mean that no object is really present ahead of the vehicle 10, but does simply mean that no object is determined to be present within the area defined based on the processing capability of the radar unit 34 and imaging unit 36, When the result in S24 is affirmative, i.e., when it is determined that the object present ahead of the vehicle 10 is recognized by the radar unit 34 at the current time, the program proceeds to S32, in which it is determined whether the object present ahead of the vehicle 10 was also recognized by the radar unit 34 at the previous time. When the result in S32 is affirmative, the program proceeds to S34, in which continuity of the object is determined in a same manner as that of S20.

On the contrary, when the result in S32 is negative, i.e., when the object present ahead of the vehicle 10 was recognized only by the imaging unit 36 at the previous time, but is recognized only by the radar unit 34 at the current time, the program proceeds to S36.

In S36, it is determined whether the object recognized only by the radar unit 34 at the current time is present at a position within a predetermined area defined by a position of the object recognized by the imaging unit 36 at the previous time. The predetermined area is also set to be a value (based on the processing capability of the radar unit 34 and imaging unit 36) that enables to determine that the object recognized at the previous time and that recognized at the current time are identical to each other to be one same object. The predetermined area in S36 may be same as that in S20 or may be different therefrom.

When the result in S36 is affirmative, the program proceeds to S38, in which it is determined that the object recognized only by the imaging unit 36 at the previous time and that recognized only by the radar unit 34 at the current time is identical to each other to be one same object which is kept recognized continuously, and the program is terminated.

When the result in S36 is negative, i.e., when it is determined that the object recognized by the radar unit 34 at the current time is not identical to the object recognized at the previous time, the program proceeds to S40, in which the object recognized at the current time is assigned with new identification number (ID), and the program is terminated.

As explained above, this embodiment is configured to determine that, when the object (first object) recognized by any one of the radar unit 34 and imaging unit 36 at the current time (N) is present at a position within the predetermined area defined by a position of the object (second object) recognized by other of the radar unit 34 and imaging unit 36 at the previous time (N−1) that is earlier than the current time (N), the first object and the second object are identical to each other to be one object which is kept recognized continuously for a time period ranging from at least the time (N−1) to the time (N).

Furthermore, this embodiment is configured to assign the recognized object a common identification number (GID) commonly used by the radar unit 34 and imaging unit 36 when the object is recognized by at least one of the radar unit 34 and imaging unit 36 to improve recognition accuracy.

Figure 4:
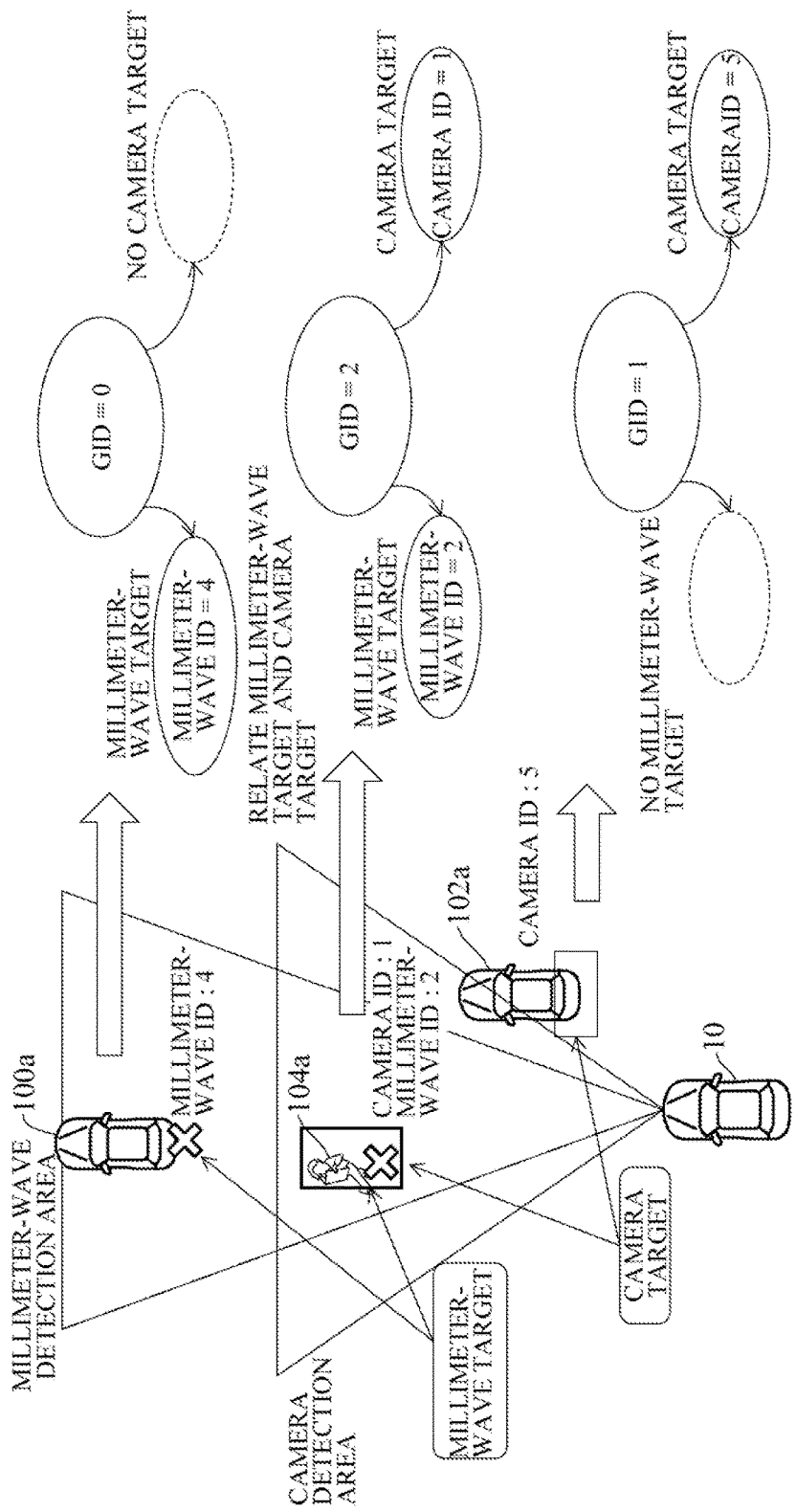
FIG. 4 is a diagram for explaining common identification number assignment processing of the object recognition apparatus shown in FIG. 1.

FIG. 4 is a diagram for explaining the common identification number (GID) assignment processing.

The processing will be explained based on an assumption that objects (preceding vehicles) 100a, 102a and an object (pedestrian) 104a are present ahead in the advance direction of the vehicle 10.

As shown in FIG. 4, it is assumed that the object 100a is present within a millimeter-wave detection area detectable by millimeter wave emitted from the radar 34a of the radar unit 34, but is not present within a camera detection area detectable by the camera 36a of the imaging unit 36. Therefore, the object 100a is assigned with a millimeter-wave ID (individual identification number; individual ID) such as 4 as a millimeter-wave target, but is not assigned with a camera ID (individual identification number; individual ID) as a camera target.

Since the object 102a is present within the camera detection area, but is not present within the millimeter-wave detection area, it is assigned with a camera ID such as 5 as a camera target, but is not assigned with a millimeter-wave ID as a millimeter-wave target.

On the other hand, since the object 104a is present within an overlapped area of the millimeter-wave detection area and camera detection area, it is assigned with a millimeter-wave ID such as 2 as a millimeter-wave target and assigned a camera ID=1 as a camera target respectively.

Again referring to the conventional technology, the millimeter-wave target and camera target were never processed in a common manner. Accordingly, if the object 100a will be recognized by the imaging unit 36 and assigned with a new camera ID as a camera target in a next time, there is a possibility that the camera target recognized and stored at the next time is not related to the millimeter-wave target (millimeter-wave ID=4) recognized and stored as the object 100a at a time earlier than the next time.

On the contrary, this embodiment is configured to assign, in addition to the millimeter-wave ID and camera ID assigned in the conventional technology, the common identification numbers (GID) is assigned to the objects (100a, 102a, 104a) recognized by at least any one of the radar unit 34 and imaging unit 36 such that the continuity determination can be processed for the objects in a lump.

More specifically, as shown in FIG. 4, this embodiment is configured to assign a GID such as 0 to the object 100a, assign a GID such as 1 to the object 102a and assign a GID such as 2 to the object 104a, irrespectively of which of the radar unit 34 and imaging unit 36 recognizes the object. As a result, if the object 100a is recognized only by the imaging unit 36 and assigned with a new camera ID as a camera target in the next time, it becomes possible to determine whether or not the object 100a is kept recognized continuously with the use of the common identification number (GID=0).

Figure 5:
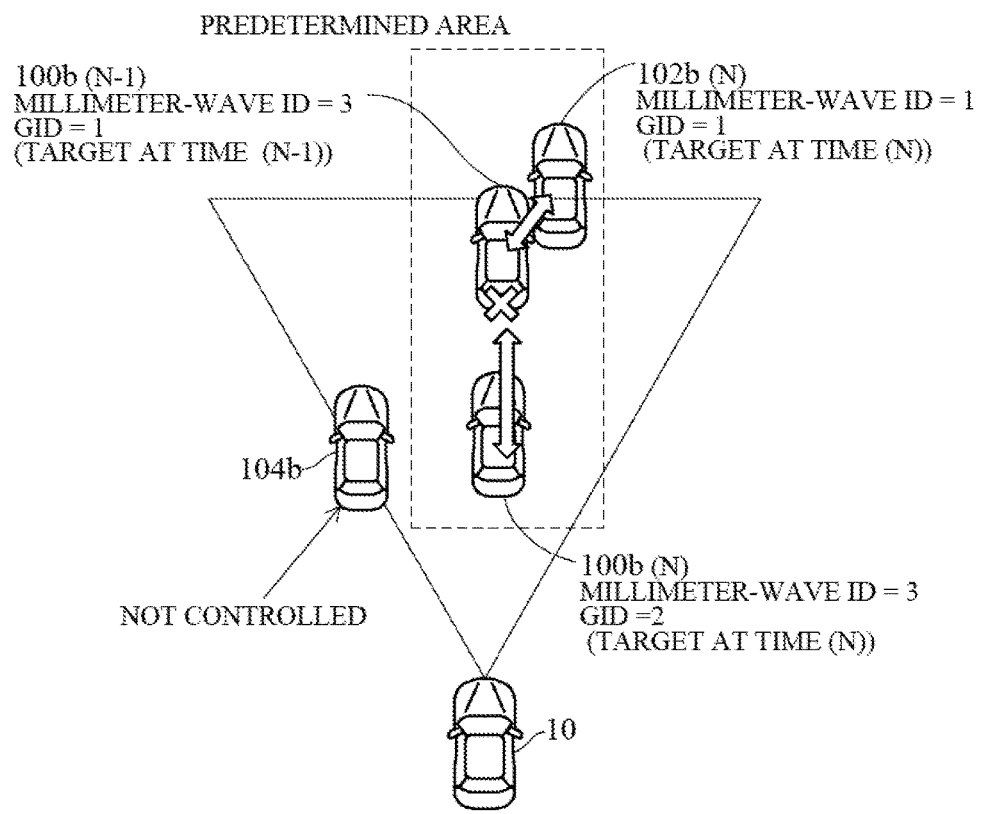
FIG. 5 is a diagram for explaining common identification number assignment processing of the object recognition apparatus shown in FIG. 1.
Figure 6:
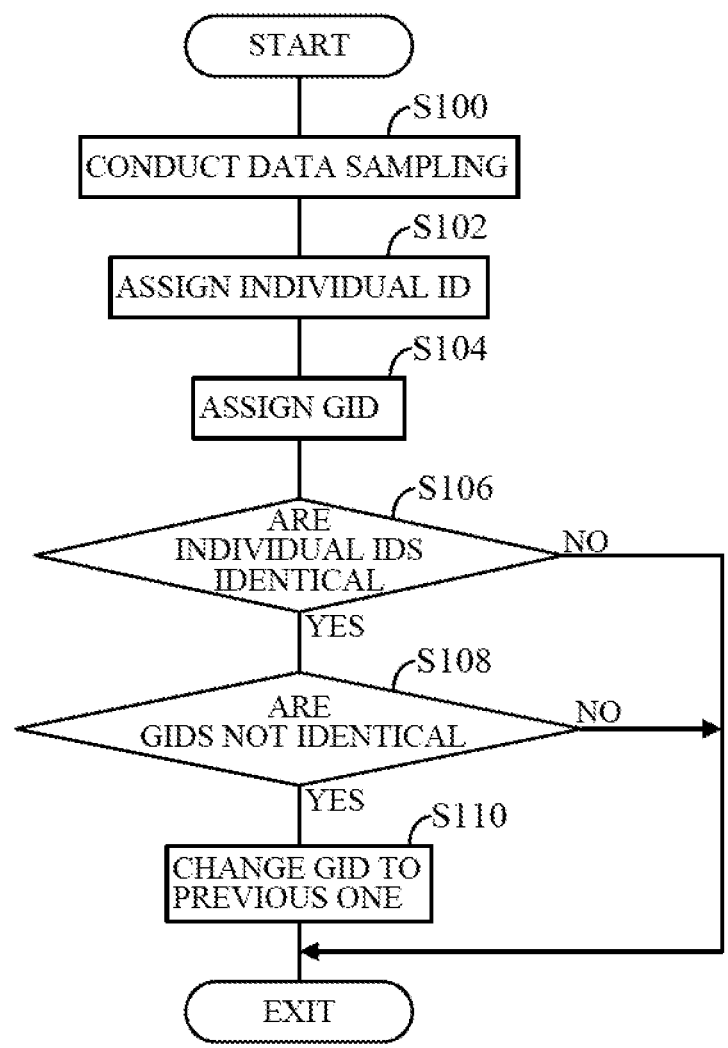
FIG. 6 is a flowchart showing common identification number assignment processing of the object recognition apparatus, shown in FIG. 4 and FIG. 5.

FIG. 5 is a diagram for explaining the common identification number (GID) assignment processing, and FIG. 6 is a flowchart showing the processing shown in FIG. 5.

As mentioned above, this embodiment is configured to assign a common identification number (GID), in addition to the individual ID (millimeter-wave ID, camera ID) assigned to each of the recognizers (radar unit 34, imaging unit 36) respectively.

In that case, depending on the situation for recognizing the object present ahead of the vehicle 10, there is a possibility that the individual ID (millimeter-wave ID, camera ID) or common identification number (GID) is not identical to each other. Namely, there is a possibility to assign the identification number improperly.

To explain specifically, the individual ID (millimeter-wave ID, camera ID) is separately assigned to an object recognized when each of the recognizers (radar unit 34 and imaging unit 36) recognizes it. Accordingly, when an object can be kept recognized continuously by one of the recognizers, the individual ID is kept used for the object continuously.

On the other hand, the common identification number (GID) is a number that is assigned to an object when it is recognized by one of the recognizers. The object is basically kept assigned with same common identification number (GID) based on its position at the previous time, moving speed and moving direction and the like. Accordingly, depending on a situation ahead of the vehicle 10, the individual ID and common identification number (GID) may lose its continuity.

Explaining this more specifically with reference to FIG. 5. In FIG. 5, it is assumed that a single preceding vehicle 100b (N−1) was recognized by the radar unit 34 at the previous time (time point N−1) and a plural number of preceding vehicles 100*b* (N) and 102*b* (N) are recognized similarly by the radar unit 34 at the current time (time point N).

In such case, the ECU 40 assigns the preceding vehicle 100*b* (N) a same millimeter-wave ID (for example, millimeter-wave ID=3) as that of the preceding vehicle 100*b* (N−1) recognized at the previous time based on the recognition result of the radar unit 34, as the individual ID (millimeter-wave ID).

In addition, the ECU 40 assigns the preceding vehicle 102*b* (N) recognized at the current time a same GID (for example, GID=1) as that of the preceding vehicle 100*b* (N−1) recognized at the previous time and whose position is closest to a position of the preceding vehicle 100*b* (N) based on comparison of the positions of the preceding vehicle 100*b* (N−1) recognized at the previous time and preceding vehicles 100*b* (N) recognized at the current time, while assigning another new GID (for example, GID=2) to the preceding vehicle 100*b* (N) recognized at the current time.

As a result, despite that both the previously recognized preceding vehicle 100*b* (N−1) and the currently recognized preceding vehicle 100*b* (N) are assigned with the same ID (millimeter-wave ID=3) as the individual ID (millimeter-wave ID), the previously recognized preceding vehicle 100*b* (N−1) and the currently recognized preceding vehicle 100*b* (N) are assigned with different GIDs (GID=1 and GID=2) as the common identification numbers (GIDs) that do not agree with each other disadvantageously.

Particularly, such a phenomenon is likely to occur when a distance between the preceding vehicle 100*b* and signs (signboards), utility poles, street trees and the like on the road are short. In view of this, the embodiment of this invention aims to correct or change the GID properly.

FIG. 6 is a flowchart shows the processing.

To explain in the following, the program begins at S100, in which the ECU 40 conducts data sampling, i.e., to obtain the recognition result from the radar unit 34 and imaging unit 36. Next, the program proceeds to S102, in which any recognized object(s) is assigned with the individual ID (millimeter-wave ID and/or camera ID) based on the recognition result obtained in S100.

The program next proceeds to S104, in which each recognized object is assigned with the GID. As mentioned above, the GID is assigned with the same GID as that of the currently recognized object determined to be closest based on the position of the object(s) at the previous time, moving speed, moving direction and the like, while the other object(s) is assigned with a new GID(s).

Next, the program proceeds to S106, in which it is determined whether the individual IDs assigned to the previously and currently recognized objects in S102 are identical to each other. As mentioned above, when the object is kept recognized continuously by one same recognizer (radar unit 34 or imaging unit 36), the individual ID is never changed. Therefore, when the recognized object is determined to be kept recognized continuously by at least one recognizer, the result in S106 is affirmative and the program proceeds to S108.

In S108, it is determined whether the GIDs assigned to the previously and currently recognized objects (i.e., object determined in S106) in S104 are not identical to each other (not the same). When the result in S108 is negative, since it can be determined that the individual IDs assigned to the previously and currently recognized objects are identical and there is no need to correct pr change the GID, the program skips the ensuing processing steps is terminated.

On the other hand, when the result in S108 is affirmative, i.e., when it can be determined that the GIDs assigned to the previously and currently recognized objects are not identical to each other, more precisely, when it can be determined that the previously and currently recognized objects are assigned with the same individual IDs but assigned with different GIDs, the program proceeds to S110.

In S110, the GID assigned to the currently recognized object in S104 is changed. More specifically, since the processing in S110 is performed on the assumption that the individual IDs assigned to the previously and currently recognized objects are the same, the GID is changed to the number same as the previous one based on the individual IDs, and the program is terminated.

Explaining this again referring to the case shown in FIG. 5, as described above, among of the preceding vehicles 100*b* (N) and 102*b* (N) recognized at the current time (N), the ECU 40 assigns to the preceding vehicle 102*b* (N) the same GID (GID=1) as that of the preceding vehicle 100*b* (N−1) whose position is closest to the position of the preceding vehicle 100*b* (N−1) recognized at the previously time (N−1).

On the contrary, since the radar unit 34 recognizes the preceding vehicle 100*b* continuously, the preceding vehicle 100*b* (N−1) recognized at the previous time and the preceding vehicle 100*b* (N) recognized at the current time are assigned with the same individual ID (millimeter-wave ID=3), and the preceding vehicle 102*b* (N) is assigned with another millimeter-wave ID=1 as the millimeter-wave ID.

Even in such case, by performing the processing shown in FIG. 6 on the previously recognized preceding vehicle 100*b* (N−1) and currently recognized preceding vehicle 100*b* (N), it becomes possible to correct the GID number (GID=2) assigned to the currently recognized preceding vehicle 100*b* (N) to the number (GID=1) assigned to the previously recognized preceding vehicle 100*b* (N−1).

As mentioned above, in this embodiment, since it is configured to correct or change the GID properly based on the individual IDs when the GIDs assigned to the object at the previous time and the current time are not identical to each other, it becomes possible to continuously recognize the object more reliably.

Figure 7:
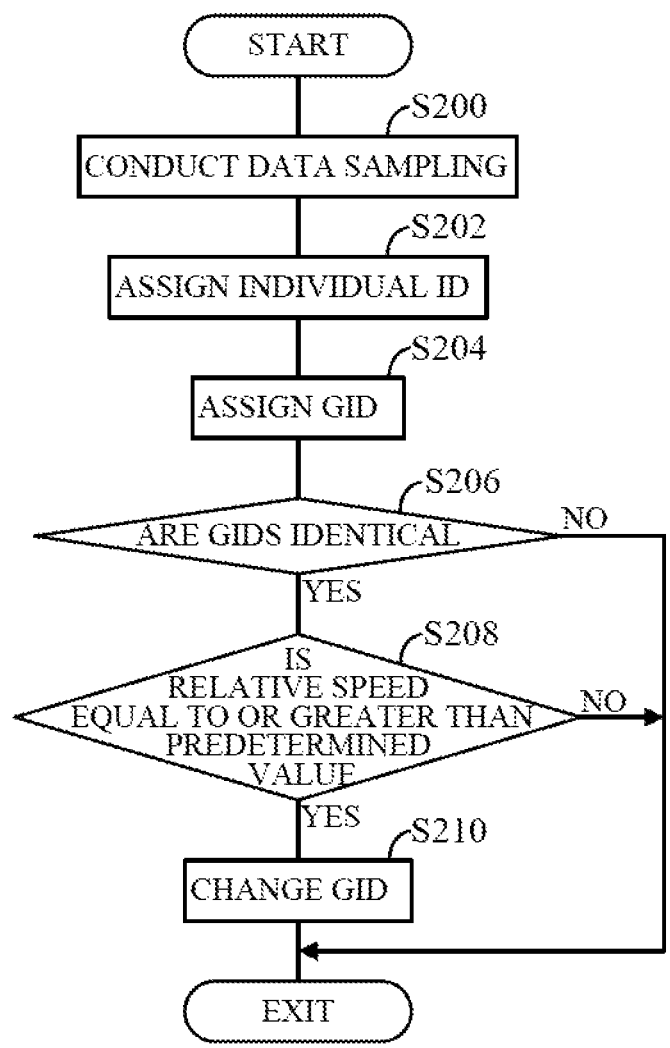
FIG. 7 is a similar flowchart as FIG. 6, showing common identification number assignment processing of the object recognition apparatus, shown in FIG. 5.

FIG. 7 is a flowchart showing a variation of the processing shown in FIG. 6.

In the variation shown in FIG. 7, it is configured to change the GID properly, when a same GIDs is assigned to the object recognized at the previous time and current time, although the object are actually objects that are not the same.

Explaining this, in S200 to S204, the same processing as those in S100 to S104 of FIG. 6 is performed. Namely, in the example shown in FIG. 5, the previously recognized preceding vehicle 100*b* (N−1) is assigned with the millimeter-wave ID=3 and GID=1, whilst the currently recognized preceding vehicle 100*b* (N) and 102*b* (N) are assigned with the millimeter-wave ID=3, GID=2 and millimeter-wave ID=1, GID=1 respectively.

The program next proceeds to S206, in which it is determined whether the GIDs assigned to the previously and currently recognized objects in S204 are the same. When the result in S206 is affirmative, the program proceeds to S208, in which it is determined whether the same GID is to the identical object properly.

To be more specific, it is determined on the objects assigned with the same GIDs whether a speed difference (relative speed) between the previous and current time points of recognition, in other words, a relative speed of the currently recognized object to the previously recognized object is equal to or greater than a predetermined value.

When the result in S208 is negative, since it is highly possible that the previously recognized object and the currently recognized object are the same, the GID is not changed, and the program is terminated.

However, when the result in S208 is affirmative, since it can be determined that the previously recognized object and the currently recognized object are not the same, the program proceeds to S210, in which the currently recognized object is reassigned with a GID that is different from the GID assigned in S204, and the program is terminated.

When the result in S206 is negative, i.e., when the previously recognized object and the currently recognized object are assigned with different GIDs, since the above mentioned problem in this variation does not exist, the GID is not changed and the program is terminates.

Furthermore, in S210, based on the position of the object recognized at the previous time, moving speed, moving direction and the like, an object whose position is secondly closest to the previously recognized object is assigned with the same GID as that of the previous one. It is alternatively to assign a same GID as the previous one to an object selected at random and to repeat the above mentioned processing, where by enabling to assign GID properly.

In addition, in the above mentioned variation, although it is configured in S208 to determine the properness of the GID assigned in S204 based on the relative speeds of the currently recognized objects to the previously recognized object, it can instead be configured to determine the properness of the assigned GID based on the relative speeds of the recognized objects to the vehicle 10.

This means that it can also be configured to determine whether a relative-speed difference between the relative speed of the object recognized at the previous time to the vehicle 10 and the relative speed of the object recognized at the current time to the vehicle 10 is equal to or greater than a prescribed value, and when the result is affirmative, to change or correct the GID in S210.

Explaining the processing of FIG. 7 once again referring to the case shown in FIG. 5, in which the preceding vehicle 102b (N) is assigned with the same GID (GID=1) as that of the preceding vehicle 100b (N−1) recognized at the previously time (N−1), although they are not the same.

In such case, in the processing of FIG. 7, the ECU 40 calculates (detects) speeds of the previously recognized preceding vehicle 100b (N−1) and the currently recognized preceding vehicle 102b (N) respectively, and determines whether the speed difference (relative speed difference) is equal to or greater than the predetermined value (S208).

Since the previously recognized preceding vehicle 100b (N−1) and the currently recognized preceding vehicle 102b (N) actually are not the same, it is anticipated that the calculated speed difference (relative speed difference) becomes large to some extent. Especially, as regards the preceding vehicle 102b (N) recognized for the first time at the current time, since it is highly likely to be some erroneously recognized obstacle on the road (sign, utility pole, street tree or the like), the calculated speed difference may be large to some extent. Thus, by performing the above mentioned processing, it becomes possible to change or correct the GID erroneously assigned to the preceding vehicle 102b (N) that is actually not the same as the previously recognized preceding vehicle 100b (N−1).

As described above, in the variation shown in FIG. 7, similarly to the processing in FIG. 6, since it is configured to change the GID assigned to the same object properly when the previous one and current one are not identical to each other, thereby enabling to continuously recognize the object more reliably.

Figure 8:
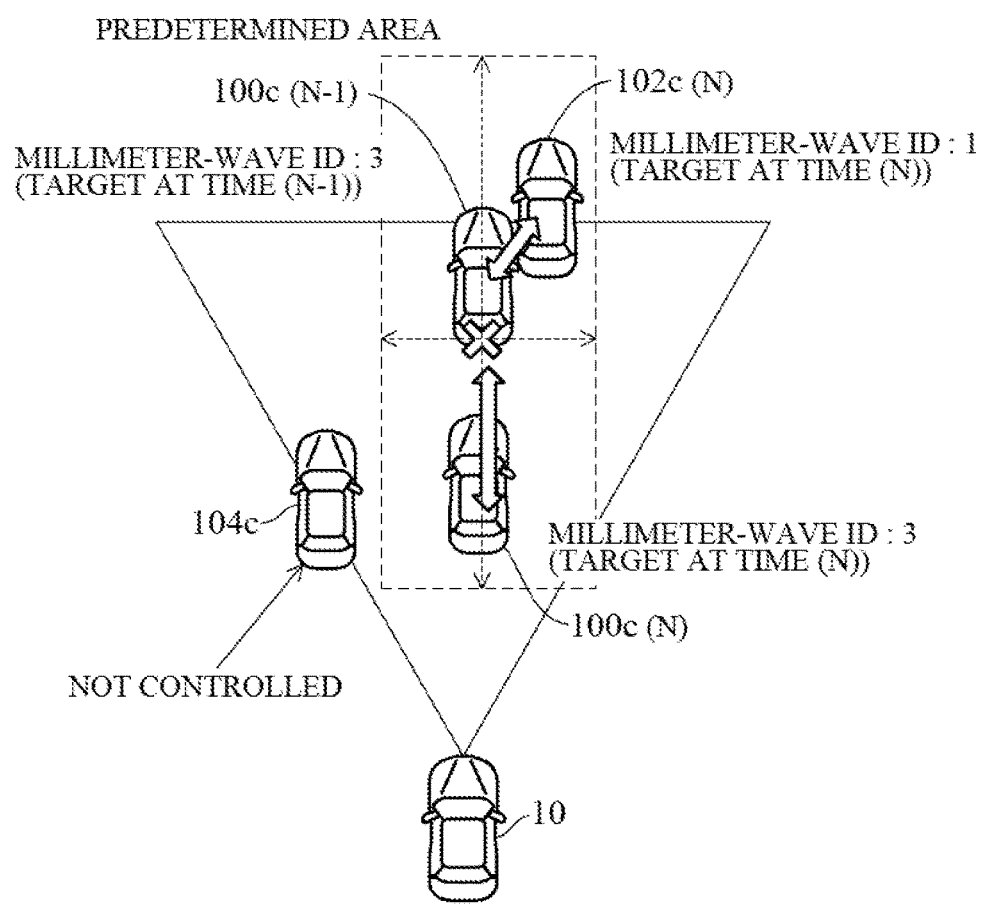
FIG. 8 is a diagram for explaining processing for expanding a predetermined area for object recognition of the object recognition apparatus shown in FIG. 1.

FIG. 8 is a diagram for explaining processing for expanding the predetermined area for object recognition of the ECU 40.

As mentioned above, in this embodiment, it is configured to use the radar unit 34 as the first recognizer, while to use the imaging unit 36 as the second recognizer. It is well known that when recognizing some object using a millimeter-wave beam like that emitted from the radar 34a of the radar unit 34, recognition accuracy is relatively high with respect to the direction of millimeter-wave beam transmission (advance direction of the vehicle 10), however, with respect to the lateral or transversal direction thereof (lateral to the advance direction of the vehicle 10), recognition accuracy is not very high.

Besides, when recognizing an object(s) with the use of a camera (particularly a monocular camera) like the camera 36a of the imaging unit 36, recognition accuracy is not very high with respect to the advance direction of the vehicle 10. However, with respect to the direction lateral to the advance direction of the vehicle 10, recognition accuracy of the camera 36a is relatively high.

In this way, in the object recognition apparatus having a plurality of recognizers of different characteristics, when the previously and currently recognized object(s) is recognized by different recognizers, it is preferable to change the aforesaid predetermined area properly based on the characteristics of the recognizers.

Therefore, in this embodiment, it is configured to change or enlarge the predetermined area based on the characteristics of the recognizer that recognizes the object. Specifically, when the object was recognized by the radar unit 34 (first recognizer) at the previous time but is recognized by the imaging unit 36 (second recognizer) at the current time, since the recognition accuracy of the imaging unit 36 that recognizes the object at the current time in the advance direction of the vehicle 10 is relatively low, it is configured to enlarge the predetermined area in the advance direction of the vehicle 10.

Further, when the object was recognized by the imaging unit 36 (second recognizer) at the previous time but is recognized by the radar unit 34 (first recognizer) at the current time, since the recognition accuracy of the radar unit 34 that recognizes the currently recognized object in the lateral direction of the vehicle 10 is relatively low, it is configured to enlarge the predetermined area in the lateral direction of the vehicle 10.

It should be noted that, when the recognizers that recognize the object at the previous time and the current time are the same, the predetermined area is set to an initial value same as the conventional technology, in other words, an initial value determined based on the characteristics of the recognizer.

As mentioned above, in this embodiment, it is configured, even when the recognizers that recognizes the object at the previous time and the current time are different from each other, to change or enlarge the predetermined area for determining the identically of the object based on the characteristics of the recognizers, thereby enabling to continuously recognize the object more reliably.

Embodiment 2

Figure 9:
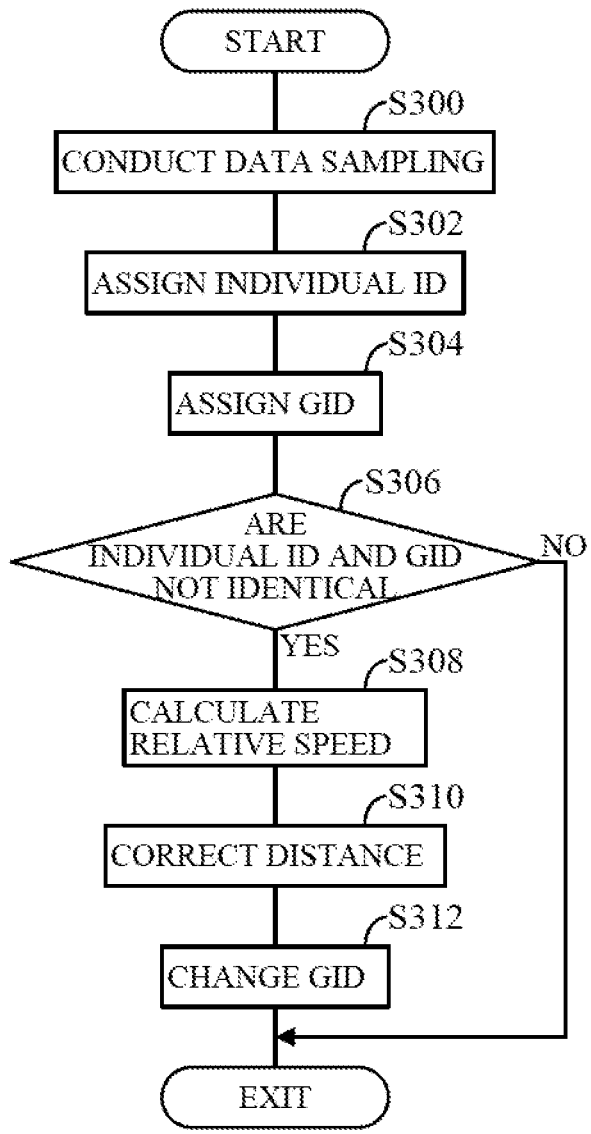
FIG. 9 is a flowchart showing common identification number assignment processing of the object recognition apparatus according to a second embodiment of this invention.

FIG. 9 is a flowchart showing common identification number (GID) assignment processing of the object recognition apparatus according to a second embodiment of this invention.

Explaining this, in S300 to S304, the same processing as those in the first embodiment (S100 to S104, S200 to S204) is performed, and the program proceeds to S306, in which it is determined whether a combination of the individual ID and GID assigned to the object recognized at the current cycle and a combination of the individual ID and GID assigned to the object recognized at the previous time are not identical to each other.

In the example shown in FIG. 5, it is determined whether a combination of the individual IDs and GIDs assigned to the currently recognized preceding vehicles 100b (N), 102b (N) and the previously recognized preceding vehicle 100b (N−1) are not identical to each other.

When the result in S306 is negative, i.e., when it is determined that the combinations of the individual IDs and GIDs of the previously recognized object and the currently recognized object are identical to each other, since it is considered that the previously recognized object and the currently recognized object are erroneously recognized, the program skips the ensuing processing steps.

On the other hand, when the result in S306 is affirmative, the program proceeds to S308, in which a relative speed between the previously recognized object and the currently recognized object is calculated. In the example shown in FIG. 5, the relative speeds between the preceding vehicle 100b (N−1) recognized at the previous time and the preceding vehicles 100b (N), 102b (N) recognized at the current time are calculated respectively.

The program next proceeds to S310, in which a relative distance of the currently recognized object to the previously recognized object is corrected base on the relative speed calculated in S308.

Specifically, in the case when the calculated relative speed is high, since the relative distance of the currently recognized object to the previously recognized object becomes greater than in the case when the relative speed is low, the object may not be recognized reliably if simply comparing the relative distances of the currently recognized objects to the previously recognized object.

Accordingly, in the second embodiment, taking such difference into account, it is configured to correct to increase an apparent relative distance of the currently recognized object to the previously recognized object when the relative speed is high, while to correct to decrease the apparent relative distance when the relative speed is low.

In the flowchart, the program next proceeds to S312, in which the corrected relative distances of the currently recognized objects to the previously recognized object are compared, and it is determined that one currently recognized object, whose relative distance to the previously recognized object is the smallest is the same as the previously recognized object, and the GID of the one object is changed to a number same as the GID of the previously recognized object.

Further, although not illustrated, in the second embodiment, when the GID of a specific object has once been changed in the above processing, this makes the specific object more likely to be determined to be identical to the previously recognized object in the next and succeeding processing (program loops).

Furthermore, It can also be configured, for example, to set an acceptable limit (threshold value) of the specific object for determining it as the identical object with higher possibility than other objects, or to correct to decrease the relative distance to the previous position, so as to recognize the object more stably and continuously.

It should be noted that, in the above embodiments, although it is configured to correct the relative distance of the currently recognized object to the previously recognized object based on the relative speed of the currently recognized object to the previously recognized object, it can instead or additionally be configured to correct it based on a relative speed or relative distance of the currently recognized object to the vehicle 10. Namely, it can be configured to correct the relative distance to make it more likely to determine that the previously and currently recognized objects are the same as the position of the currently recognized object becomes nearer to the vehicle 10.

As stated above, the first and second embodiment of this invention is configured to have an apparatus or method mounted on a vehicle, comprising: a plurality of recognizers (radar unit 34, imaging unit 36) each adapted to conduct object recognition ahead of the vehicle at intervals; and an object continuity determiner (ECU 40) adapted to conduct object continuity determination based on a result of the object recognition conducted by the recognizers; wherein: the object continuity determiner determines that, when a first object recognized by any of the object recognizers at time (N) is present at a position within a predetermined area defined by a position of a second object recognized by other of the object recognizers at time (N−1) earlier than the time (N), the first object and the second object are identical to each other to be one object which is kept recognized continuously for a time period ranging from at least the time (N−1) to the time (N) (S10-S38). With this, even when it is determined that the object was recognized by one recognizer previously but is recognized by the other recognizer currently, it becomes possible to determine that the object previously recognized by one recognizer and the object currently recognized by the other recognizer are identical to be one object kept recognized continuously for a time period ranging from at least the time (N−1) to the time (N), thereby enabling to recognize the object continuously.

In the apparatus or method, the object continuity determiner includes: a common identification number assigner adapted to assign a common identification number (GID) to the first object and the second object (S104, S204, S304). Specifically, it is configured to assign GID to the recognized object recognized at least once by either of the multiple recognizers. With this, in addition to the effects and advantages mentioned above, it becomes possible to process the recognized object(s) by the multiple recognizers in common, thereby enabling to continuously recognize the object more reliably.

In the apparatus or method, the object continuity determiner includes: an individual identification number assigner adapted to assign an individual identification number (individual ID) to the first object and the second object; and the common identification number assigner changes the common identification number assigned to the first object, when the individual identification number assigned to the first object is identical to the individual identification number assigned to the second object, but the common identification number assigned to the first object is not identical to the common identification number assigned to the second object (S106-S110). With this, in addition to the effects and advantages mentioned above, even when the GIDs assigned to the identical object in the previous and current times are different from each other, it becomes possible to change or correct the GID based on the individual ID, thereby enabling to continuously recognize the object more reliably.

In the apparatus or method, the common identification number assigner changes the common identification number assigned to the first object, when the common identification number assigned to the first object is identical to the common identification number assigned to the second and a relative speed of the first object to the second object is equal to or greater than a predetermined value (S206-S210). With this, in addition to the effects and advantages mentioned above, it becomes possible to determine the properness of the GID assigned to the currently recognized object, and, when the assigned GID is determined to be improper, to change or correct the GID properly, thereby enabling to continuously recognize the object more reliably.

In the apparatus or method, the common identification number assigner changes the common identification number assigned to the first object, when the common identification number assigned to the first object is identical to the common identification number assigned to the second object and a relative speed difference between a relative speed of the first object to the vehicle and a relative speed of the second object to the vehicle is equal to or greater than a prescribed value (S206-S210). With this, as mentioned above, it becomes possible to determine the properness of the GID assigned to the currently recognized object, and, when the assigned GID is determined to be improper, to change or correct the GID properly, thereby enabling to continuously recognize the object more reliably.

In the apparatus or method, the common identification number assigner includes: a relative speed calculator that calculates a relative speed of the first object to the second (S308); and a relative distance corrector that corrects a relative distance of the first object to the second object based on the relative speed calculated by the relative speed calculator. With this, in addition to the effects and advantages mentioned above, it becomes possible to assign the currently recognized object the GID appropriately, thereby enabling to continuously recognize the object more reliably.

In the apparatus or method, the object continuity determiner includes: an individual identification number assigner adapted to assign an individual identification number (individual ID) to the first object and the second object; and the common identification number assigner changes the common identification number assigned to the first object based on the relative distance corrected by the relative distance corrector, when the individual identification number and the common identification number assigned to the first object and the individual identification number and the common identification number assigned to the second object are not identical to each other (S306-S312). With this, in addition to the effects and advantages mentioned above, it becomes possible to determine the properness of the GID assigned to the currently recognized object more accurately, and, when the currently assigned GID is determined to be improper, to change or correct the GID properly, thereby enabling to continuously recognize the object more reliably.

In the apparatus or method, the object continuity determiner defines the predetermined area based on a characteristic of any of the recognizers that recognizes the first object or the second object. With this, in addition to the effects and advantages mentioned above, even when the recognizers that recognize the object in the previous and current times are different from each other, it becomes possible to set or enlarge the predetermined area for determining the identicality of the object properly, thereby enabling to continuously recognize the object more reliably.

In the apparatus or method, the recognizers includes a first recognizer comprising a radar (34a) and a second recognizer comprising an imaging device (36a), and the object continuity determiner enlarges the predetermined area in an advance direction in which the vehicle advances when the other that recognizes the second object is the first recognizer and any of the recognizers that recognizes the first object is the second recognizer, while enlarging the predetermined area in a direction lateral to the advance direction when the other that recognizes the second object is the second recognizer and any of the recognizers that recognizes the first object is the first recognizer. With this, in addition to the effects and advantages mentioned above, even when the recognizers that recognize the object in the previous and current times are different from each other, it becomes possible to set or enlarges the predetermined area for determining the identically of the object properly based on the characteristics of the recognizer, thereby enabling to continuously recognize the object more reliably.

Although in the foregoing embodiment the first recognizer is the radar unit 34 that recognizes an object(s) ahead of the vehicle 10 using a millimeter-wave beam, this should not be limited thereto, and the first recognizer may any one that recognizes the object(s) using a laser beam, infrared beam or the like instead of the millimeter-wave beam.

Although the foregoing explanation takes the monocular camera 36a as an example of the imaging unit 36, this should not be limited thereto and it may be multiple cameras. If the multiple cameras be used, since it becomes possible to stereo-image an object(s), the accuracy of object recognition in the advance direction of the vehicle 10 can be improved.

Although the foregoing embodiment was explained using the radar unit 34 and the imaging unit 36 as examples of the multiple recognizer, it is additionally possible to utilize data from third, fourth recognizers, such as data obtained from the navigation unit 44 and data obtained from infrastructural features via wireless communication means and the like of the navigation unit 44.

Japanese Patent Application No. 2014-097381, filed on May 9, 2014, is incorporated by reference herein in its entirety.

While the invention has thus been shown and described with reference to specific embodiments, it should be noted that the invention is in no way limited to the details of the described arrangement; changes and modifications may be made without departing from the scope of the appended claims.

What is claimed is:

1. An object recognition apparatus mounted on a vehicle, comprising: a radar unit adapted to conduct object recognition in a millimeter-wave detection area ahead of the vehicle at intervals; an imaging unit adapted to conduct object recognition in a camera detection area ahead of the vehicle at intervals; and an object continuity determiner adapted to conduct object continuity determination in an overlapped area between the millimeter-wave detection area and the camera detection area based on a result of the object recognition conducted by the radar unit and the imaging unit; wherein: an updating cycle of the radar unit and an updating cycle of the imaging unit differ from each other, and the object continuity determiner determines that, when a first object recognized by any one of the radar unit and the imaging unit at time (N) is present at a position within a predetermined area defined by a position of a second object recognized by other of the radar unit and the imaging unit at time (N−1) earlier than the time (N), the first object and the second object are identical to each other to be one object which is kept recognized continuously for a time period ranging from at least the time (N−1) to the time (N); wherein the object continuity determiner conducts a data sampling to obtain the result of the object recognition conducted by the radar unit and the imaging unit, and a sampling cycle of the data sampling is shorter than either of the updating cycles of the radar unit and the imaging unit.

2. The apparatus according to claim 1, wherein the object continuity determiner includes:
a common identification number assigner adapted to assign a common identification number to the first object and the second object.

3. The apparatus according to claim 2, wherein the object continuity determiner includes:
an individual identification number assigner adapted to assign an individual identification number to the first object and the second object (S102, S202);
and the common identification number assigner changes the common identification number assigned to the first object, when the individual identification number assigned to the first object is identical to the individual identification number assigned to the second object, but the common identification number assigned to the first object is not identical to the common identification number assigned to the second object.

4. The apparatus according to claim 2, wherein the common identification number assigner changes the common identification number assigned to the first object, when the common identification number assigned to the first object is identical to the common identification number assigned to the second and a relative speed of the first object to the second object is equal to or greater than a predetermined value.

5. The apparatus according to claim 2, wherein the common identification number assigner changes the common identification number assigned to the first object, when the common identification number assigned to the first object is identical to the common identification number assigned to the second object and a relative speed difference between a relative speed of the first object to the vehicle and a relative speed of the second object to the vehicle is equal to or greater than a prescribed value.

6. The apparatus according to claim 5, wherein the common identification number assigner includes:
a relative speed calculator that calculates a relative speed of the first object to the second; and
a relative distance corrector that corrects a relative distance of the first object to the second object based on the relative speed calculated by the relative speed calculator.

7. The apparatus according to claim 6, wherein the object continuity determiner includes:
an individual identification number assigner adapted to assign an individual identification number to the first object and the second object;
and the common identification number assigner changes the common identification number assigned to the first object based on the relative distance corrected by the relative distance corrector, when the individual identification number and the common identification number assigned to the first object and the individual identification number and the common identification number assigned to the second object are not identical to each other.

8. The apparatus according to claim 1, wherein the object continuity determiner defines the predetermined area based on a characteristic of any of the radar unit and the imaging unit that recognizes the first object or the second object.

9. An object recognition apparatus mounted on a vehicle, comprising: a plurality of recognizers each adapted to conduct object recognition ahead of the vehicle at intervals; and an object continuity determiner adapted to conduct object continuity determination based on a result of the object recognition conducted by the recognizers; wherein: the object continuity determiner determines that, when a first object recognized by any one of the object recognizers at time (N) is present at a position within a predetermined area defined by a position of a second object recognized by other of the object recognizers at time (N−1) earlier than the time (N), the first object and the second object are identical to each other to be one object which is kept recognized continuously for a time period ranging from at least the time (N−1) to the time (N) wherein the object continuity determiner conducts a data sampling to obtain the result of the object recognition conducted by the radar unit and the imaging unit, and a sampling cycle of the data sampling is shorter than either of the updating cycles of the radar unit and the imaging unit and the recognizers includes a first recognizer comprising a radar and a second recognizer comprising an imaging device, and the object continuity determiner enlarges the predetermined area in an advance direction in which the vehicle advances when the other that recognizes the second object is the first recognizer and any of the recognizers that recognizes the first object is the second recognizer, while enlarging the predetermined area in a direction lateral to the advance direction when the other that recognizes the second object is the second recognizer and any of the recognizers that recognizes the first object is the first recognizer.

* * * * *